United States Patent Office 2,759,025
Patented Aug. 14, 1956

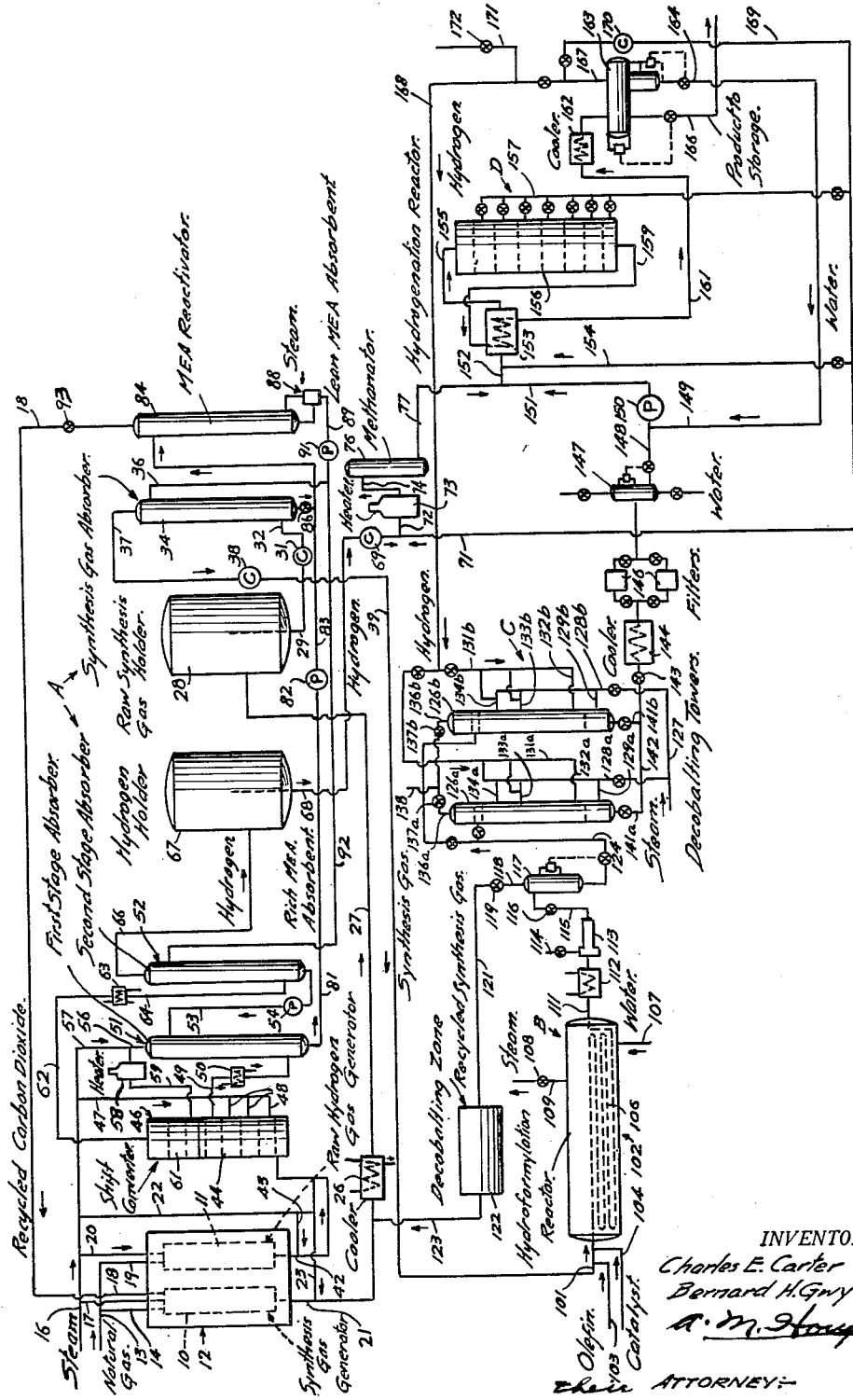

2,759,025

PROCESS FOR PRODUCING ALCOHOLS

Charles E. Carter, Canonsburg, and Bernard H. Gwynn, Tarentum, Pa., assignors, by direct and mesne assignments, to Gulf Research & Development Company, Pittsburgh, Pa., a corporation of Delaware Application January 17, 1952, Serial No. 266,836

2 Claims. (Cl. 260—638)

This invention relates to a process for the production of alcohols by the reaction between a synthesis gas comprising hydrogen and carbon monoxide and an olefin or olefins to produce aldehydes which are then preferably hydrogenated to the corresponding alcohols. The invention relates more particularly to an improved process for making synthesis gas and hydrogen adapted for use in the hydroformylation, demetalling, and hydrogenation steps of the over-all process for the manufacture of alcohols.

The process for the manufacture of alcohols from an olefin or olefins and a synthesis gas comprising hydrogen and carbon monoxide is generally known as the Oxo process. The complete process includes the steps of manufacturing synthesis gas and hydrogen; reacting the synthesis gas with olefins to form aldehydes, the hydroformylation step; and hydrogenating the aldehydes. Also, the process usually includes a step wherein metals are removed from the aldehydes prior to hydrogenation. The economics of the process is dependent to an important extent upon the manner in which the several steps or subprocesses are integrated to permit efficient utilization of the raw materials employed.

The present invention from one aspect relates to an over-all process comprising the steps of manufacturing a synthesis gas containing hydrogen and carbon monoxide by the reaction between natural gas and carbon dioxide, preferably in the presence of steam and excess carbon dioxide; manufacturing hydrogen by the reaction between steam and natural gas to form hydrogen and carbon monoxide in a high ratio of hydrogen to carbon monoxide; converting the carbon monoxide to carbon dioxide and recovering the carbon dioxide for use in the manufacture of synthesis gas; reacting the synthesis gas produced in the synthesis gas reaction with an olefin in the presence of a metallic catalyst to form aldehydes; removing metals from the aldehydic product of this reaction by a procedure involving the use of a part of the hydrogen manufactured in the hydrogen-producing step; and hydrogenating the demetalled aldehydic product with hydrogen produced in the hydrogen-producing step.

From a more specific aspect the present invention is directed to a self-contained process for manufacturing synthesis gas and hydrogen adapted for use in the other stages of the over-all Oxo process. We have discovered that synthesis gas having the desired hydrogen to carbon monoxide mol ratio, preferably a mol ratio of about 1:1, and substantially pure hydrogen, in proportions required for the hydroformylation, demetalling, and hydrogenation steps of the Oxo process can be produced by a method comprising the following steps. Methane, or more usually natural gas, is employed in both the manufacture of synthesis gas and the initial reaction for the production of hydrogen, an equal quantity of natural gas being employed in each of these steps. The charge for the manufacture of synthesis gas is essentially natural gas and carbon dioxide in a mol ratio of about 1:1, but in order to suppress formation of carbon and deposition of this carbon on the catalyst, an excess of carbon dioxide is employed at least equal to the amount of carbon dioxide required for reaction with the natural gas. Since the presence of this excess carbon dioxide would have a tendency to change the ratio of hydrogen to carbon monoxide in the final synthesis gas, steam in also employed in an amount to furnish about one mol of steam for each mol of excess carbon dioxide. The product gas from the manufacture of synthesis gas, the raw synthesis gas, is composed essentially of hydrogen, carbon monoxide and carbon dioxide, the carbon dioxide being the excess charge to the synthesis gas generation. This excess carbon dioxide is removed from the raw synthesis gas and recycled to the synthesis gas generation.

The method for the production of hydrogen is carried out in accordance with the invention by charging to a suitable catalyst a mixture of natural gas and steam in about equimolar amounts so as to yield a final synthesis gas containing hydrogen and carbon monoxide in a mol ratio of about 3:1. It is preferred in this operation, however, to employ an excess of steam, for example, about twice as much steam as is necessary for the reaction, in order to suppress carbon formation and deposition of this carbon on the catalyst. The resulting raw hydrogen gas containing carbon monoxide is then subjected to shift conversion to convert the carbon monoxide to carbon dioxide which is then removed from the hydrogen by a suitable absorbent. Since one mol of carbon dioxide is reacted with one mol of natural gas in the manufacture of synthesis gas, the same amount of natural gas is employed both in the manufacture of synthesis gas and the manufacture of hydrogen gas reaction, the carbon dioxide obtained from the raw hydrogen gas is the amount required for reaction with the natural gas in the manufacture of synthesis gas. This carbon dioxide, together with that removed from the raw synthesis gas, is recirculated to the synthesis gas generator to provide the carbon dioxide required for reaction with natural gas and that required for suppression of carbon formation and deposition.

In order that the invention may be understood more fully, reference should be had to the attached drawing, the single figure of which is a more or less diagrammatic flow diagram of a complete plant for the production of alcohols using as raw materials natural gas, steam and a suitable olefin or olefins. In the drawing, the showing of many flow control devices has been omitted in the interest of clarity.

Referring to the drawing, the plant consists of four main units. The unit designated A is the synthesis gas and hydrogen unit in which the synthesis gas and hydrogen required for the other operations are produced. Unit B is the hydroformylation unit in which the synthesis gas manufactured in unit A is reacted with an olefin or olefins in the presence of a metallic catalyst, preferably cobalt, to produce the desired aldehydes. Unit C is employed for removing metals, particularly cobalt, from the product produced in unit B. Unit D is the unit in which the aldehydic materials substantially free from metallic contaminants are hydrogenated to form the desired alcohols. The operations of these units are co-ordinated in accordance with the invention so that the entire plant operation is self-contained in that the amounts of synthesis gas and hydrogen produced in unit A are the amounts needed for operation of the other units of the plant. Moreover, the operation of unit A is itself self-contained in that the carbon dioxide required for carrying out the manufacture of synthesis gas is produced in the operation of the unit itself.

Referring to the drawing more specifically, unit A comprises a synthesis gas generator 10 and a raw hydrogen gas generator 11. These generators are contained within a single shell 12 provided with means for supplying heat, not shown, whereby the desired reaction temperature can be maintained. These two generators are substantially identical in construction and comprise a plurality of reaction tubes, not shown, containing nickel catalyst, preferably a catalyst consisting of about 20 per cent by weight of nickel on an alumina support.

The charge to reactor 10 is a combination of natural gas, steam and carbon dioxide. The essential reaction occurring in this reactor may be represented by the equation:

(I) $$CH_4 + CO_2 \rightarrow 2CO + 2H_2$$

However, in order to prevent the build-up of carbon on the catalyst, the feed contains about twice as much carbon dioxide as is necessary for the generation of synthesis gas and for each mol of excess carbon dioxide about one mol of steam is included in the feed in order to maintain the 1:1 ratio of carbon monoxide and hydrogen in the product. The natural gas is introduced into the reactor through lines 13 and 14, the steam through lines 16 and 17, and the carbon dioxide through line 18, about half of the natural gas entering the system through line 13 being passed through line 14. As will be described more fully hereinafter, the carbon dioxide is recycled carbon dioxide from operation within unit A. Although the temperature of the feed entering the synthesis gas generator is not too important, it is generally preferable to employ a temperature somewhat above atmospheric; for example, a temperature of about 100° to 600° F. The reaction illustrated by the above equation is endothermic and therefore heat is supplied to the tubes of reactor 10. This reaction is carried out so that the temperature of the gases leaving the reactor is about 1400° to 1500° F.

The feed to the reactor 11 is steam and natural gas in proportions such as to produce a product gas comprising hydrogen and carbon monoxide in a mol ratio of about 3:1. Thus the reaction occurring in this reactor may be represented by the equation:

(II) $$CH_4 + H_2O \rightarrow CO + 3H_2$$

In this reactor, for every mol of steam required for the reaction, one mol of excess steam is employed for suppressing carbon formation. The natural gas charged to this reactor is introduced through lines 13 and 19 and the steam through lines 16 and 20. The amount of natural gas introduced into this reactor should be at least substantially the same as the amount fed to reactor 10. The entering and exit temperatures will normally be the same as those employed in reactor 10.

The product gas from the synthesis gas generator 10 is removed through line 21 and is admixed with sufficient steam introduced through lines 16, 22 and 23 to cool it to a temperature such as about 700° to 800° F., from which it can be further cooled to a desirable low temperature in conventional cooling equipment. This gas is then passed through a cooler 26 in which the gas is cooled to approximately 110° F., the steam condensed, and the resulting water removed. The resulting gas is passed through line 27 to a raw synthesis gas holder 28. This holder contains a water seal, not shown, and the synthesis gas is removed from the upper portion of the holder through a line 29 leading to a compressor 31. In this compressor the gas is compressed in two stages to a pressure of the order of 250 p. s. i. g. and at this pressure is introduced through line 32 into an absorber 34 wherein it is contacted in countercurrent fashion with an absorbent for carbon dioxide, preferably monoethanolamine, introduced through line 36. The resulting synthesis gas substantially free from carbon dioxide is removed overhead from absorber 34 through line 37 and is compressed in compressor 38 in two stages to the pressure desired for the hydroformylation reaction, for example a pressure of about 3500 p. s. i. g., and at this pressure is flowed through line 39.

The product gas from the raw hydrogen gas generator 11 is removed from the reactor through line 42 and is quenched by steam introduced through lines 22 and 43 to a temperature desired for the following shift conversion reaction; for example a temperature of about 700° to 800° F. The gas at the resulting temperature and containing some steam is introduced into the first stage of shift conversion which is effected in the lower section 44 of a shift converter 46. There is disposed in the lower section 44 a plurality of beds of shift conversion catalyst; in this instance four beds of an iron oxide catalyst, not shown. The essential reaction that occurs in this shift converter can be represented by the equation:

(III) $$CO + H_2O \rightarrow CO_2 + H_2$$

Thus, a substantial amount of the carbon monoxide formed in the raw hydrogen gas generator is converted to carbon dioxide and steam is converted to hydrogen. In order to maintain the temperature during this reaction and also to provide excess reaction steam, steam is introduced between beds of the catalyst through line 16, line 47 and lines 48.

The gas resulting from the shift conversion reaction in section 44 is removed through line 49 and is cooled in cooler 50 to a temperature of about 100° F. At this temperature steam is condensed and is removed from the cooler. The cooled gas is introduced into the first stage 51 of a two-stage absorption system including this first stage absorber and a second stage absorber 52. In the first stage absorber the gas is contacted in countercurrent fashion with a suitable absorbent, preferably monoethanolamine, removed from the bottom of the second stage absorber 52 through line 53 provided with pump 54, to remove substantially all of the carbon dioxide from the gas. The scrubbed gas, which still contains a trace of carbon monoxide is removed through line 56 from the first stage absorber 51 and is combined with steam introduced through lines 16 and 57, the steam being introduced in at least sufficient amount to effect the desired shift conversion reaction with respect to the remaining carbon monoxide.

The resulting mixture of steam and gas is heated in heater 58 to the temperature of the shift conversion reaction, for example, a temperature of 700° to 800° F., and flowed through line 59 into the upper section 61 of the shift converter 46. In this section the gases are contacted with iron oxide catalyst, preferably disposed in two beds, not shown, in order to effect conversion of substantially all of the remaining carbon monoxide to carbon dioxide. The converted gases are removed from the top of shift converter 46 through line 62 leading to a cooler 63 wherein the temperature is reduced to a temperature of the order of 100° F. and the condensed water is removed. The cooled gas is then flowed through line 64 leading to the second stage absorber 52 wherein it is contacted in countercurrent fashion with lean monoethanolamine absorbent to remove the carbon dioxide.

The resulting hydrogen gas is removed overhead through line 66 leading to hydrogen holder 67. Hydrogen is removed from the hydrogen holder through a line 68. This hydrogen will contain a trace of carbon monoxide; for example, about 0.2 mol per cent. To remove this trace of carbon monoxide, the hydrogen is heated to approximately 500° F. and is passed over a methanation catalyst in a methanation reaction zone wherein the carbon monoxide is converted to methane in the presence of the hydrogen. Inasmuch as the hydrogen in the present process is to be employed initially at a pressure of about 1000 p. s. i. g., as shown in the drawing it is first compressed in a compressor 69 to this pressure and conveniently is combined with recycled hydrogen flowed in a line 71, the ratio of the fresh hydrogen to the recycled hydrogen being about 1:2. This mixture is then passed through line 72 leading to a heater 73 wherein the temperature is raised to about 500° F. The heated mixture is passed through line 74 leading to a methanator 76. This methanator preferably contains a nickel catalyst, such as a catalyst comprising 45 per cent nickel on alumina. Under these conditions the carbon monoxide is converted to methane and the resulting hydrogen containing a trace of methane is removed from the methanator through line 77.

It will be seen from this description that the absorbent leaving the first stage absorber 51 will contain substantially all of the carbon dioxide formed in the two sections of shift converter 46. The carbon dioxide removed from absorber 51 in a given period will be equal to about one-half the amount of carbon dioxide charged to synthesis gas generator 10 in the same period. This rich absorbent is removed from the bottom of absorber 51 through a line 81 provided with a pump 82. This pump is employed to cause the flow of the absorbent through a line 83 leading to a reactivator 84 for the rich absorbent. The reactivator is operated at a superamospheric pressure, for example, a pressure of about 35 p. s. i. g. Additional absorbent containing absorbed carbon dioxide is introduced into line 83 through a valved line 86 leading from the bottom of the synthesis gas absorber 34. The amount of carbon dioxide in the absorbent leaving absorber 34 in a given time will about equal that leaving absorber 51. In the reactivator 84 a temperature of about 275° to 300° F. is maintained in order to strip the carbon dioxide from the monoethanolamine. This temperature is provided by means of a reboiler system indicated generally at 88. The lean absorbent is removed through line 89 and is pumped to the desired pressure by means of pump 91 and is flowed through line 92 leading to second stage absorber 52 and line 36 leading to synthesis gas absorber 34. The carbon dioxide released from the rich absorbent is passed overhead from the reactivator 84 through line 18 provided with a valve 93.

It will be seen from the foregoing description that the carbon dioxide required for the manufacture of synthesis gas as exemplified by Equation I above is produced in the form of carbon monoxide in the manufacture of raw hydrogen gas, converted to carbon dioxide in the shift converter 46 and is absorbed in the first and second stage absorbers 51 and 52. While two mols of carbon dioxide are charged for each mol of natural gas introduced into synthesis gas generator 10, only one mol of carbon dioxide is consumed for each mol of natural gas and the mol consumed is that produced in the manufacture of raw hydrogen gas. It is noted also that the mol of excess carbon dioxide is removed from the raw synthesis gas in synthesis gas absorber 34 and is recirculated by means of reactivator 84 and line 18.

The synthesis gas containing hydrogen and carbon monoxide in a mol ratio of about 1:1, substantially free from carbon dioxide and at an elevated pressure of about 1500 to about 4500 p. s. i. g., and preferably about 3500 p. s. i. g., is flowed through line 39 to unit B, the hydroformylation unit. In this unit the synthesis gas is reacted with an olefin in the presence of a suitable metallic hydroformylation catalyst such as an iron or cobalt catalyst and preferably the latter, at pressures within the above range and at temperatures within the range of about 260° to 460° F. While the specific method of carrying out the hydroformylation reaction forms no part of the present invention and any suitable procedure may be used, such as one involving the use of a fixed bed reactor, it is preferred to employ a procedure wherein the synthesis gas, olefin and catalyst, introduced in the form of a salt of the metal, are flowed through an elongated reaction zone under turbulent flow conditions while controlling the temperature by indirect heat exchange with a liquid such as water. Thus, it is preferred to employ hydroformylation methods as disclosed in the application of Bernard H. Gwynn and Joel H. Hirsch, Serial No. 164,211, filed May 25, 1950.

Referring to the drawing, in a typical example about 13 mols per hour each of hydrogen and carbon monoxide are flowed through line 39 to line 101 leading to hydroformylation reactor 102. About 13 mols per hour of a suitable olefin, for example heptene, are also introduced into line 101 through line 103 and a solution of a suitable catalytic metal salt is introduced through line 104. This catalyst may be, for example, the cobalt salt of any suitable organic acid such as a fatty acid, preferably one containing at least 6 carbon atoms, or a naphthenic acid. Preferred salts are cobalt octanoate and cobalt naphthenate. Salts of this type are preferably introduced in solution in a naphtha. In general, the catalyst should be introduced in an amount corresponding to about one atomic proportion of cobalt for each 600 mols of the olefin.

The hydroformylation reactor is maintained within a few degrees of the desired reaction temperature by means of maintaining the elongated reaction zone, which is in the form of a coil 106, immersed in a body of water under pressure at its boiling point at that pressure. For example, for a reaction temperature of about 350° F., the water should be maintained at a pressure of about 120 p. s. i. g. The water is introduced through a line 107 and the pressure is maintained by means of a pressure control valve 108 in line 109 which releases the steam generated by the exothermic reaction. The elongated reaction zone or coil 106 is extremely long compared to its diameter. Thus, it should be a pipe 1 to 5 inches in internal diameter and it should have an elongation factor (ratio of length to diameter) of at least 1,440. Under the conditions indicated, the synthesis gas, olefin and catalyst are flowed through the reaction zone under turbulent flow conditions and the desired hydroformylation reaction resulting in the production of aldehydes is accomplished. During the initial stages, the cobalt salt is apparently converted to cobalt carbonyl and therefore the hydroformylation product removed through line 111 contains aldehydes, some alcohols, unreacted olefins and synthesis gas, and cobalt carbonyl. Also, even in cases where iron is not employed as a catalyst, the product frequently contains a small amount of iron apparently also present as the carbonyl as it appears that some iron is picked up from the equipment employed.

The hydroformylation product at substantially the reaction temperature is then cooled in a cooler 112 to reduce the temperature, for example, to a temperature of from about 100° to 120° F., and then is introduced into a high pressure separator 113 from which some excess synthesis gas is removed through valved line 114. The hydroformylation product is passed from separator 113 through line 115 provided with a pressure reducing valve 116 to a separator 117 operated at a pressure of the order of 300 p. s. i. g. Synthesis gas is passed overhead from this separator through line 118 provided with a pressure release valve 119 and enters a line 121 at a pressure slightly above atmospheric. This gas will contain a small amount of cobalt or other metal which should be removed. To accomplish this, the gas is passed through a decobalting zone 122 wherein the gas is demetalled by any suitable method; for example, it can be contacted with pumice at an elevated temperature. The demetalled gas is then flowed through line 123 and is combined with the fresh synthesis gas flowing in line 21.

The liquid hydroformylation product removed from separator 117 is flowed through line 124 and is passed into one of two decobalting towers 126a and 126b. These towers are filled with an inert porous material such as pumice or the like. One tower is used at a time as it is necessary periodically to remove or revivify the pumice. While the towers shown are referred to as decobalting towers, they are employed to remove other metals in the hydroformylation product and of course in a case where a catalyst other than cobalt is used in the hydroformylation reaction, the towers will be used primarily for recovering that metal. Also, in the usual case where cobalt catalyst is employed, the hydroformylation product will also contain some iron normally in the form of iron carbonyl. These towers are preferably operated as described in the application of Charles E. Carter, Serial No. 232,198, now Patent No. 2,721,136 filed June 8, 1951.

In his case it will be assumed that tower 126a is in operation. This tower is operated at a pressure of about 200 to 250 p. s. i .g. There is introduced into the bottom of the tower through manifold line 127 and lines 128a and 129a steam at a pressure such as to produce in the bottom of the tower a temperature of the order of 375° to 400° F. At a point somewhat above the bottom of the bed of pumice, hydrogen is introduced into the tower through a manifold line 131a and a line 132a. The hydrogen has the effect of reducing the partial pressure of the steam and causing the steam to move upwardly through the tower. Also, at spaced points along the tower a mixture of steam and hydrogen is introduced through lines 133a and 134a. The proportions of steam and hydrogen are adjusted so as to maintain the desired temperature gradient upwardly through the tower, which is preferably from about 380° F. to about 100° F. Under these conditions the cobalt carbonyl in the hydroformylation product is decomposed in the upper portion of the tower and the resulting cobalt is deposited on the pumice. Other metal carbonyls are decomposed at higher temperatures and therefore these metals will be deposited on the pumice in the lower portions of the bed of pumice. The gases leaving the top of tower 126a are removed through line 136a provided with valve 137a and, since these gases contain a substantial amount of impurities, they are vented to the atmosphere through line 138.

The hydroformylation product, substantially free of metals, is removed from the tower through line 141a and line 142. The pressure on this product is preferably reduced to about 25 p. s. i. g. by means of valve 143 and at this pressure is cooled to a temperature of about 100° F. in a cooler 144. The cooled product is then passed through one of two filters 146. These filters may be mechanical filters or they may be clay filters. They are effective to remove from the hydroformylation product any suspended material, such as pumice fines, and to break the emulsion which may be formed by the organic compounds and the water present.

From the filters the product is introduced into a separator 147 wherein water is removed. The liquid product is flowed through line 148 where it is joined by recycled water flowing in line 149 and is pumped by means of pump 150 to a pressure of about 1000 p. s. i. g., at which pressure it is flowed through line 151. During the flow of the liquid through line 148 it can be joined by any recycle aldehydes separated from the final product. It is then mixed with hydrogen flowing in line 77 and the resulting mixture is flowed through line 152 leading to heat exchanger 153. Recycled hydrogen is added to this mixture through line 154. The combination of the liquid hydroformylation product with the heated hydrogen plus the heat added in heat exchanger 153 is sufficient to raise the temperature of the mixture to about 350° to 400° F., preferably about 370° to 390° F.

At this temperature the mixture is flowed through line 155 and into a hydrogenation reactor indicated generally at 156. This reactor is constructed and operated as disclosed in the application of Bernard H. Gwynn, Serial No. 203,588, filed December 30, 1950. As shown, this reactor is provided with a plurality of beds of a suitable hydrogenation catalyst, preferably a nickel catalyst, and is maintained at a pressure of about 1000 p. s. i. g. In order to control the temperature in this reaction and provide sufficient hydrogen for shifting the reaction equilibrium towards the efficient hydrogenation of the aldehydes to alcohols, recycled hydrogen is introduced through manifold line 157 and through individual lines leading between the beds of catalyst. This hydrogen is introduced at a temperature below the temperature of the reaction, for example, a temperature of 100° to 125° F. The product from the hydrogenation reaction is removed through line 159 and is passed through heat exchanger 153 to supply heat for the hydrogenation reaction. It is then flowed through line 161, cooled in cooler 162 and passed into separator 163. From this separator, water is removed through line 164 and recycled to line 149, the desired alcohol product through line 166, and hydrogen through line 167. A part of this hydrogen is employed in unit C, the decobalting unit, and this part is passed through line 168. The remainder flows through line 169, is compressed in compressor 170 and is divided into three streams which are passed respectively through lines 157, 154 and 71 as previously described.

In the foregoing description, discussion of the relative amounts of hydrogen flowing in the various lines has been omitted in the interests of clarity. These relative proportions may be described best by reference to a specific condition of operation. In a case where about 125 BP/SD of heptene is charged to the hydroformylation reactor and conversion of this product into octylaldehydes amounts to 75 to 80 per cent of the charge, the fresh hydrogen needed will amount to about 10,000 standard cubic feet per hour (s. c. f./h.). Of this 10,000 s. c. f./h., about 4000 s. c. f./h. will be required for actual reaction with the aldehydes and about 1000 s. c. f./h. are dissolved and leave the system with the liquid alcohol product. However, the total amount of hydrogen that will leave separator 163 through line 167 will be about 105,000 s. c. f./h. 5,000 s. c. f./h. of this hydrogen will be required for use in the decobalting towers and 100,000 will be recycled to the hydrogenation unit About 60,000 s. c. f./h. will be introduced between the beds of the catalyst in the hydrogenation reactor 156, about 20,000 s. c. f./h. will be admixed with the fresh hydrogen and passed through methanator 76 and about 20,000 s. c. f./h. will be added to the feed to the hydrogenation reactor through line 154 Under these conditions, the reaction is carried out efficiently without poisoning the catalyst and under accurate temperature control. It will be noted that a portion of the recycled hydrogen is being continuously treated for the removal of carbon monoxide and that the catalyst will be contacted with an excess of 5,000 s. c. f./h. In order to maintain pressure in the hydrogenation system, a small amount of hydrogen must be continuously bled from the hydrogenation system through line 171 provided with valve 172.

The 5,000 s. c. f./h. of excess hydrogen is advantageous for two reasons. First, it helps maintain a high purity atmosphere of hydrogen within the hydrogenation reactor since inerts are purged from the system along with the excess hydrogen. Second, it is the quantity of hydrogen required to dilute the steam in the decobalting towers to obtain the desired temperature gradient and is available at a suitable high pressure.

This excess hydrogen is produced without additional cost in the integrated process for the production of synthesis gas and hydrogen as described. Thus, if no excess hydrogen were produced the reformer capacity could be reduced, but the consequent carbon dioxide deficiency for synthesis gas production would have to be generated in some other manner, for example, in an inert gas generator, and the cost of such a generator would more than offset the saving in incremental reformer capacity. The carbon dioxide absorption capacity, the most important cost item in hydrogen production, would be unchanged.

It will be seen from the foregoing description that the present invention provides an efficient process for the manufacture of alcohols. While the process preferably involves the feature of providing for the manufacture of synthesis gas excess carbon dioxide at least equal in amount to that required for reaction with the natural gas, in its broader aspects the invention includes the use of a smaller excess. Moreover if high temperature and special catalysts are employed, the use of any excess carbon dioxide may be dispensed with. However, where no excess carbon dioxide is used, it will be necessary to regenerate the catalyst periodically to remove deposited carbon.

Obviously many modifications and variations of the invention as hereinbefore set forth may be made without departing from the spirit and scope thereof, and therefore only such limitations should be imposed as are indicated in the appended claims.

We claim:

1. A process for the production of alcohols which comprises reacting one mol of natural gas and one mol of carbon dioxide in a synthesis gas generation zone in the presence of a catalyst and one additional mol of carbon dioxide and one mol of steam to produce a synthesis gas mixture containing carbon monoxide and hydrogen in a mol ratio of 1:1, one mol of carbon dioxide and one mol of steam, removing water condensed steam from said synthesis gas mixture, removing carbon dioxide from said synthesis gas mixture; reacting one mol of natural gas with one mol of steam in the presence of an additional mol of steam in a hydrogen generation zone to obtain a gas mixture comprising carbon monoxide and hydrogen in a mol ratio of 1:3 and one mol of steam, subjecting said gas mixture to a shift conversion in the presence of a shift conversion catalyst to obtain a resulting gas mixture comprising one mol of carbon dioxide and 4 mols of hydrogen, removing carbon dioxide from said resulting gas mixture to obtain a hydrogen stream, recycling the carbon dioxide removed from said synthesis gas mixture and the carbon dioxide removed from said resulting gas mixture to said synthesis gas generation zone to constitute the carbon dioxide charged thereto; reacting said gas mixture containing carbon monoxide and hydrogen with an olefin in the presence of a metal carbonyl catalyst in an elongated reaction zone at a hydroformylation pressure and a hydroformylation temperature to produce a hydroformylation reaction mixture comprising an aldehyde and dissolved metal carbonyl, passing said hydroformylation reaction mixture to a demetalling zone containing a packing material, introducing steam and hydrogen at spaced intervals along said demetalling zone to obtain temperatures varying from about 100° F. at the top of said demetalling zone to about 400° F. at the base of said demetalling zone, thereby causing said metal carbonyls to decompose and deposit the free metal on said packing, removing the demetalled hydroformylation reaction product from said demetalling zone, removing water condensed steam from said demetalled hydroformylation reaction product and passing the resulting hydroformylation reaction product together with said hydrogen stream to a hydrogenation zone, hydrogenating the aldehydes in said resulting hydroformylation reaction product in said hydrogenation zone in the presence of a hydrogenation catalyst at a hydrogenation pressure and hydrogenation temperature to obtain a hydrogenation product containing an alcohol and unreacted hydrogen, removing unreacted hydrogen from said hydrogenation product, recycling a portion of said removed hydrogen to said hydrogenation zone and recycling a second portion of said removed hydrogen to said demetalling zone to constitute the hydrogen charged thereto.

2. A process as in claim 1 wherein the hydrogen recycled to the hydrogenation zone is introduced into said hydrogenation zone at spaced intervals along said hydrogenation zone.

References Cited in the file of this patent

UNITED STATES PATENTS

| | | |
|---|---|---|
| 2,464,916 | Adams et al. | Mar. 22, 1949 |
| 2,530,989 | Parker | Nov. 21, 1950 |
| 2,609,382 | Mayland | Sept. 2, 1952 |
| 2,628,981 | Burney et al. | Feb. 17, 1953 |
| 2,638,487 | Russum et al. | May 12, 1953 |
| 2,638,488 | Cerveny | May 12, 1953 |

OTHER REFERENCES

Oil and Gas Journal, vol. 50 No. 39, Feb. 4, 1952 (pp. 41–42).